US007156447B2

(12) United States Patent
Watanabe

(10) Patent No.: US 7,156,447 B2
(45) Date of Patent: Jan. 2, 2007

(54) DOOR-OPENING/CLOSING APPARATUS

(75) Inventor: Hirofumi Watanabe, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/649,685

(22) Filed: Aug. 28, 2003

(65) Prior Publication Data

US 2004/0046401 A1 Mar. 11, 2004

(30) Foreign Application Priority Data

Sep. 10, 2002 (JP) ............................ 2002-264719

(51) Int. Cl.
*B60J 5/00* (2006.01)

(52) U.S. Cl. .............................. 296/146.4; 296/146.8; 49/503

(58) Field of Classification Search ............ 296/146.1, 296/155, 146.4, 146.8; 49/503
See application file for complete search history.

(56) References Cited

U.S. PATENT DOCUMENTS

| | | | | |
|---|---|---|---|---|
| 6,588,829 | B1 * | 7/2003 | Long et al. | 296/155 |
| 6,719,356 | B1 * | 4/2004 | Cleland et al. | 296/146.8 |
| 2003/0001728 | A1 * | 1/2003 | Flick | 340/426 |
| 2003/0030299 | A1 * | 2/2003 | Cleland et al. | 296/146.8 |
| 2003/0216817 | A1 * | 11/2003 | Pudney | 700/17 |
| 2004/0039511 | A1 * | 2/2004 | Garnault et al. | 701/49 |
| 2004/0046401 | A1 * | 3/2004 | Watanabe | 292/262 |
| 2004/0046418 | A1 * | 3/2004 | Chikata et al. | 296/146.4 |
| 2004/0124662 | A1 * | 7/2004 | Cleland et al. | 296/146.4 |
| 2004/0232723 | A1 * | 11/2004 | Sera et al. | 296/146.8 |
| 2004/0256881 | A1 * | 12/2004 | Takeda et al. | 296/146.2 |
| 2005/0012640 | A1 * | 1/2005 | Kong et al. | 340/870.17 |

FOREIGN PATENT DOCUMENTS

| | | |
|---|---|---|
| JP | 9-315157 A | 12/1997 |
| JP | 10-138762 A | 5/1998 |
| JP | 2001-132327 A | 5/2001 |
| JP | 2001-277853 A | 10/2001 |

* cited by examiner

*Primary Examiner*—Jason Morrow
(74) *Attorney, Agent, or Firm*—Sughrue Mion, PLLC

(57) ABSTRACT

The door-opening/closing apparatus includes a door, a driving unit that drives the door to close the door, a door movement detection unit that detects a movement of the door, an electrostatic switch that is mounted on the door for detecting a human's touching the door, and a judgment unit that judges whether the door is attempted to be closed. When the door movement detection unit detects a movement of the door, and when the electrostatic switch senses a human's touching the door, the judgment unit judges that the door is attempted to be closed, and then the driving unit drives to close the door.

11 Claims, 7 Drawing Sheets

DOOR-OPENING/CLOSING APPARATUS

BACKGROUND OF THE INVENTION

1) Field of the Invention

The present invention relates to a door-opening/closing apparatus applied to a door that closes an opening of a vehicle.

2) Description of the Related Art

Conventionally, there is a well-known door-opening/closing apparatus comprising a detection unit that detects a movement of a door, and a driving unit that opens and closes the door, in which if the detection unit detects that the door in its open state is slightly moved in either opening or closing direction, then the driving unit drives the door. The conventional door-opening/closing apparatus is disclosed in, for example, Japanese Patent Application Laid-open No.2001-132327, 10-138762, and 2001-277853.

According to such a door-opening/closing apparatus, however, even when the door is moved by a vibration of a body of a vehicle, the driving unit is operated to drive the door. For example, even when a child jumps in a vehicle and the door accidentally moves, the driving unit is operated to drive the door. As a result, the user is unnecessarily confused because there was no attempt to open or close the door.

SUMMARY OF THE INVENTION

It is an object of the present invention to solve at least the problems in the conventional technology.

The door-opening/closing apparatus for a vehicle according to the present invention includes a body having an opening, a door for closing the opening of the body, a driving unit that drives the door to close the door, a door movement detection unit that detects a movement of the door, and a judgment unit that judges whether the door is attempted to be closed, wherein when the door movement detection unit detects a movement of the door, and when the judgment unit judges that the door is attempted to be closed, the driving unit drives to close the door.

The other objects, features and advantages of the present invention are specifically set forth in or will become apparent from the following detailed descriptions of the invention when read in conjunction with the accompanying drawings.

DETAILED DESCRIPTION

Figure 1:
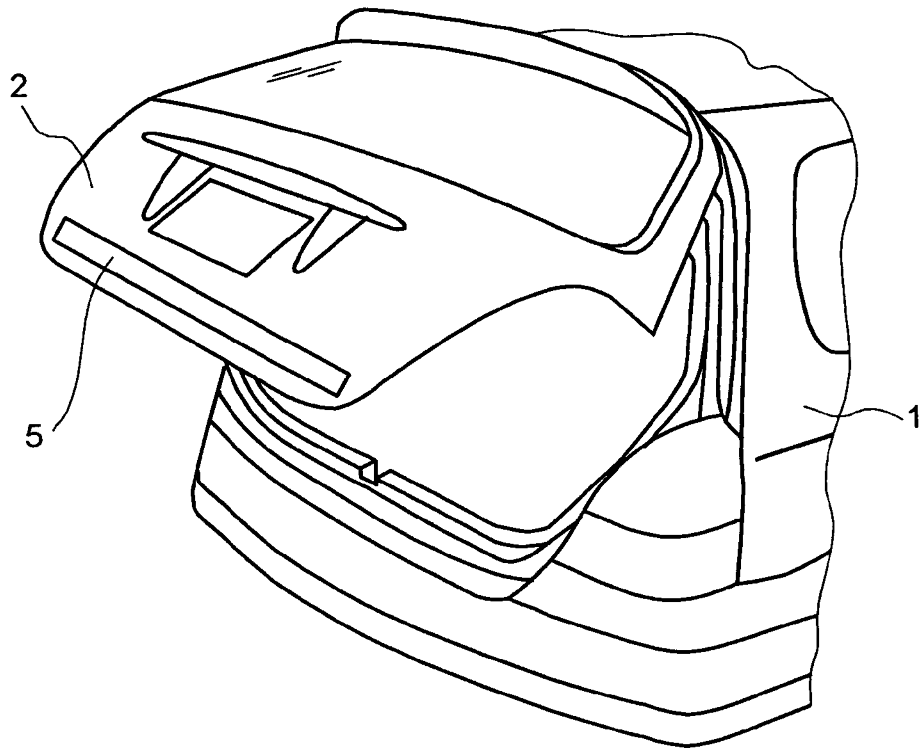
FIG. 1 is an outline view of a vehicle to which a door-opening/closing apparatus of an embodiment of the present invention is applied.
Figure 2:
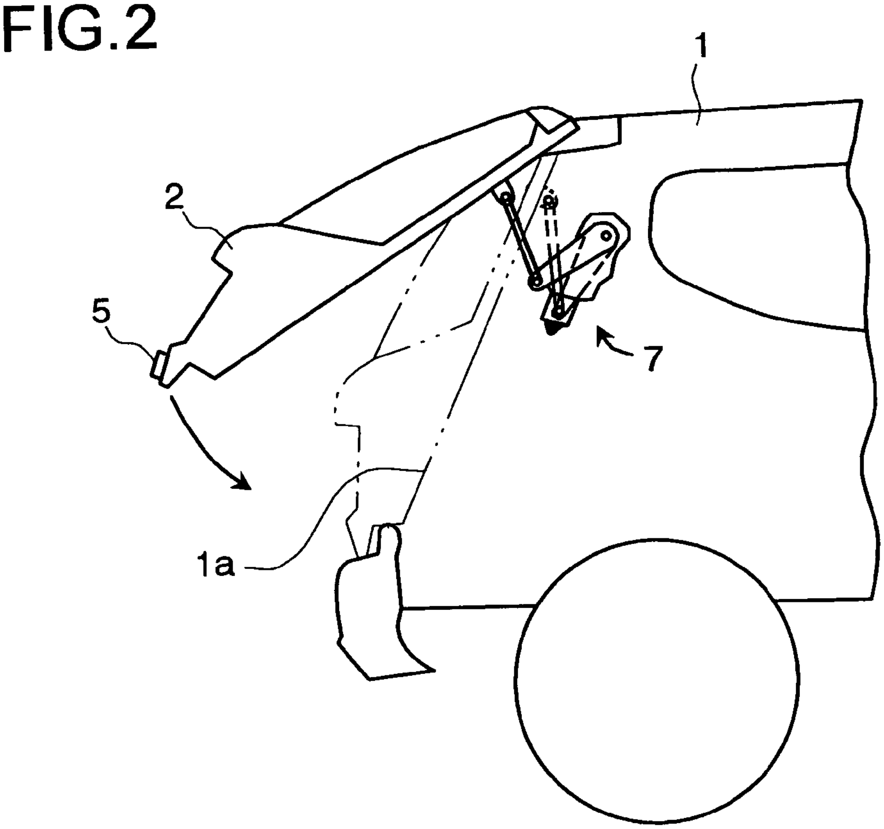
FIG. 2 is a schematic diagram of the door-opening/closing apparatus of the embodiment.
Figure 3:
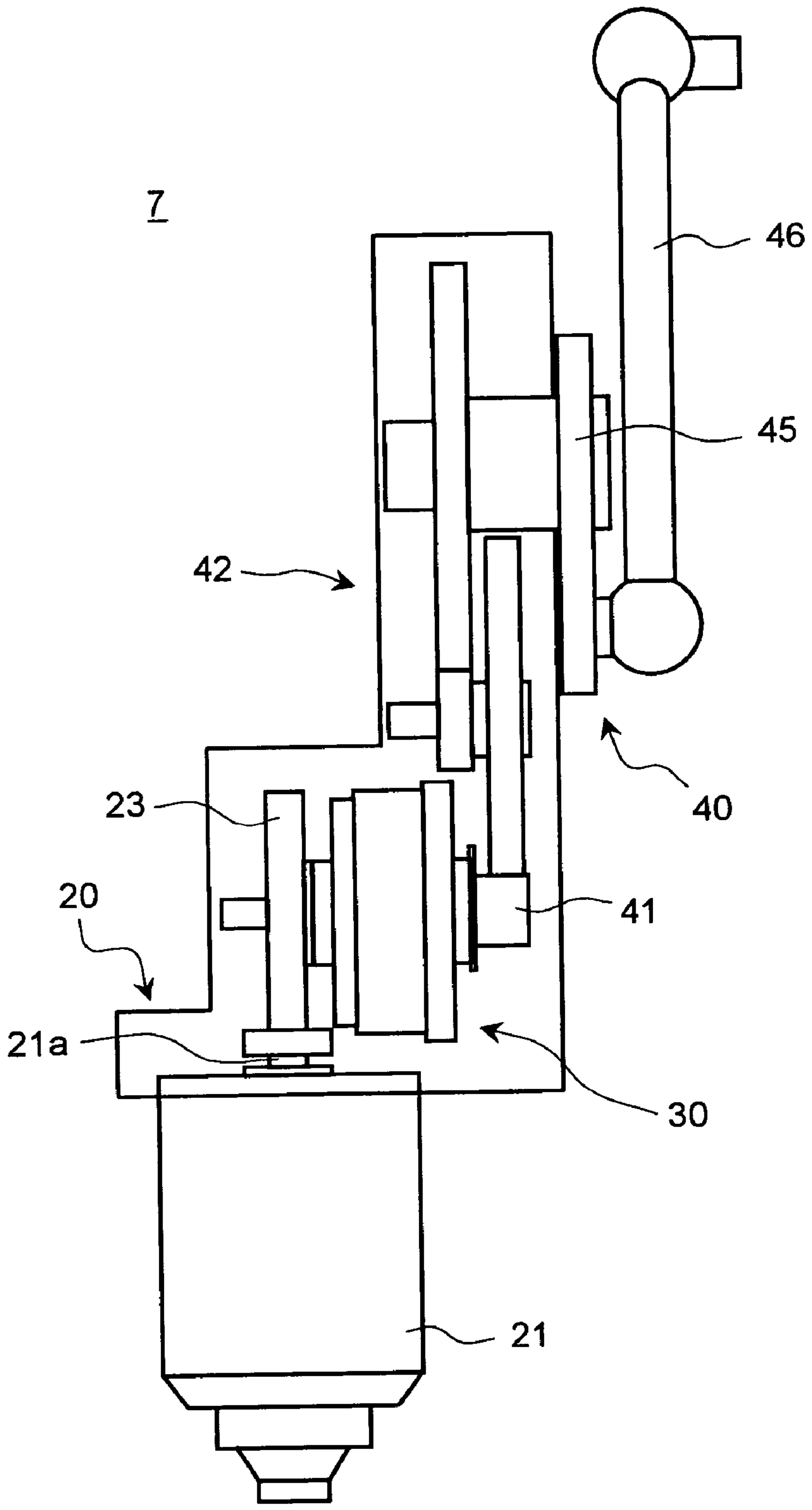
FIG. 3 is a front view of the door-opening/closing apparatus.
Figure 4:
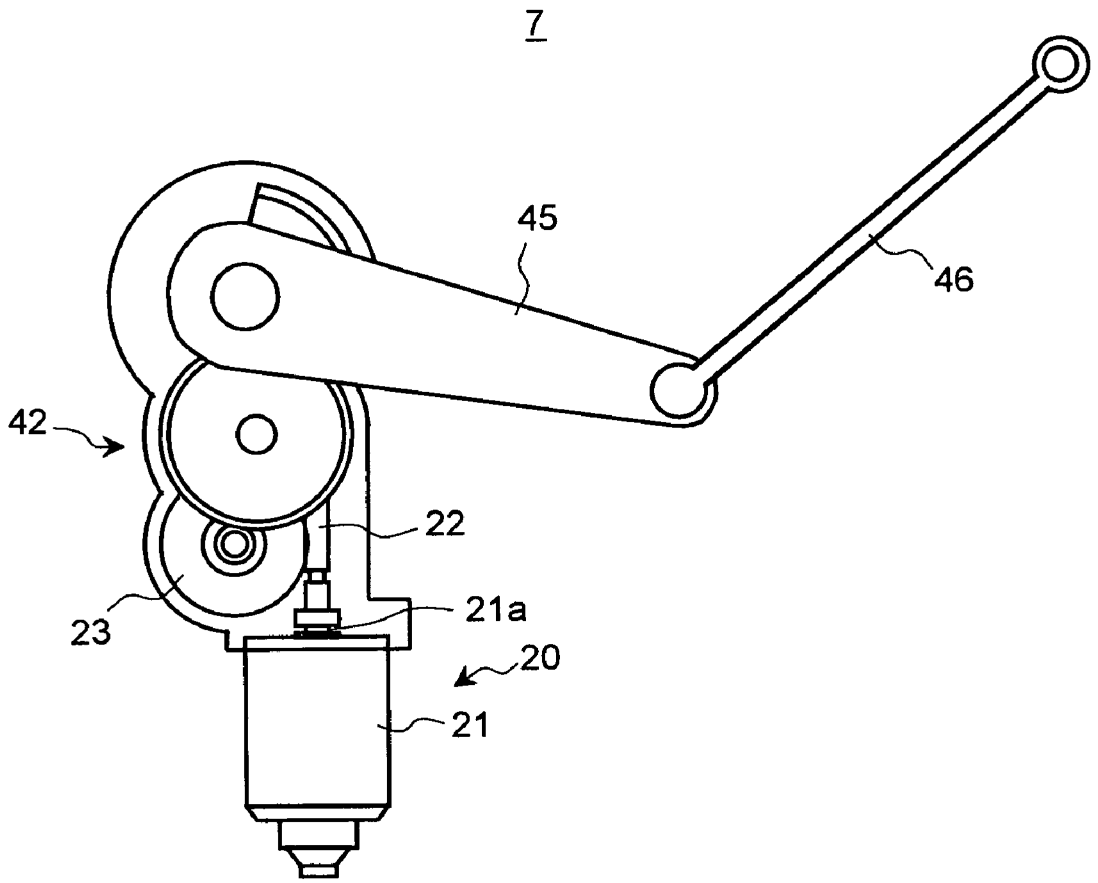
FIG. 4 is a side view of the door-opening/closing apparatus.
Figure 5:
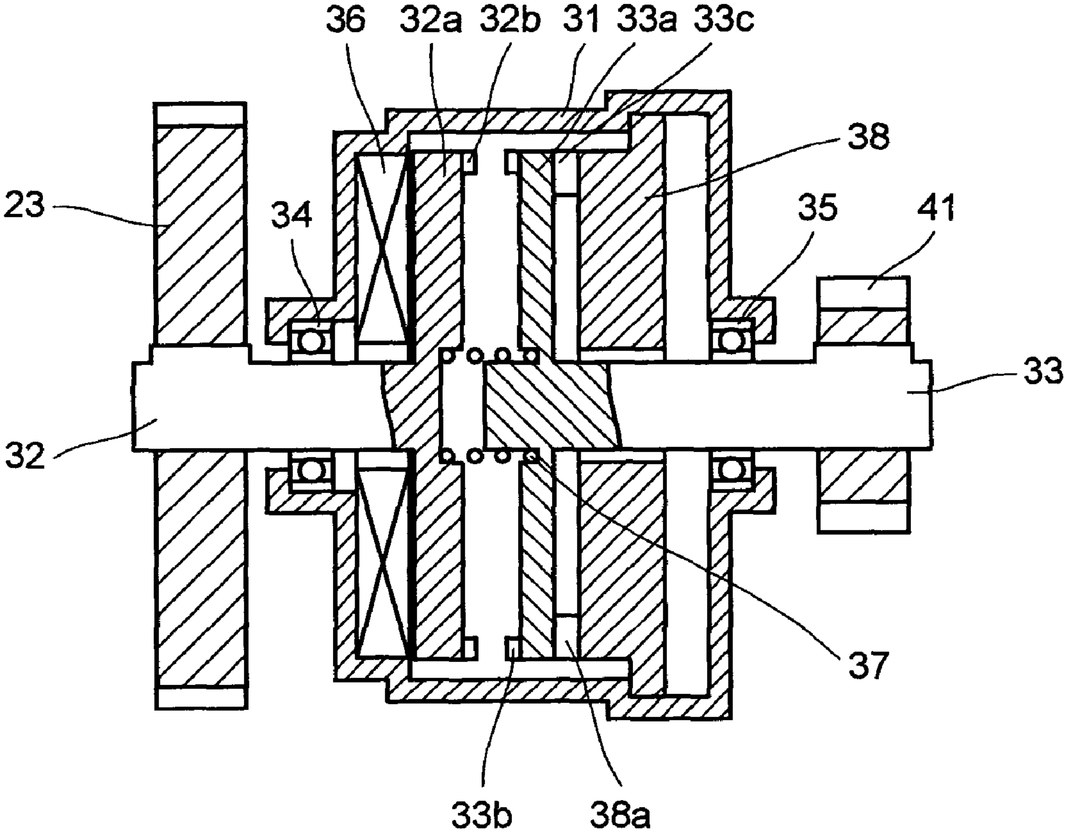
FIG. 5 is a cross-sectional view of a clutch of the door-opening/closing apparatus.
Figure 6:
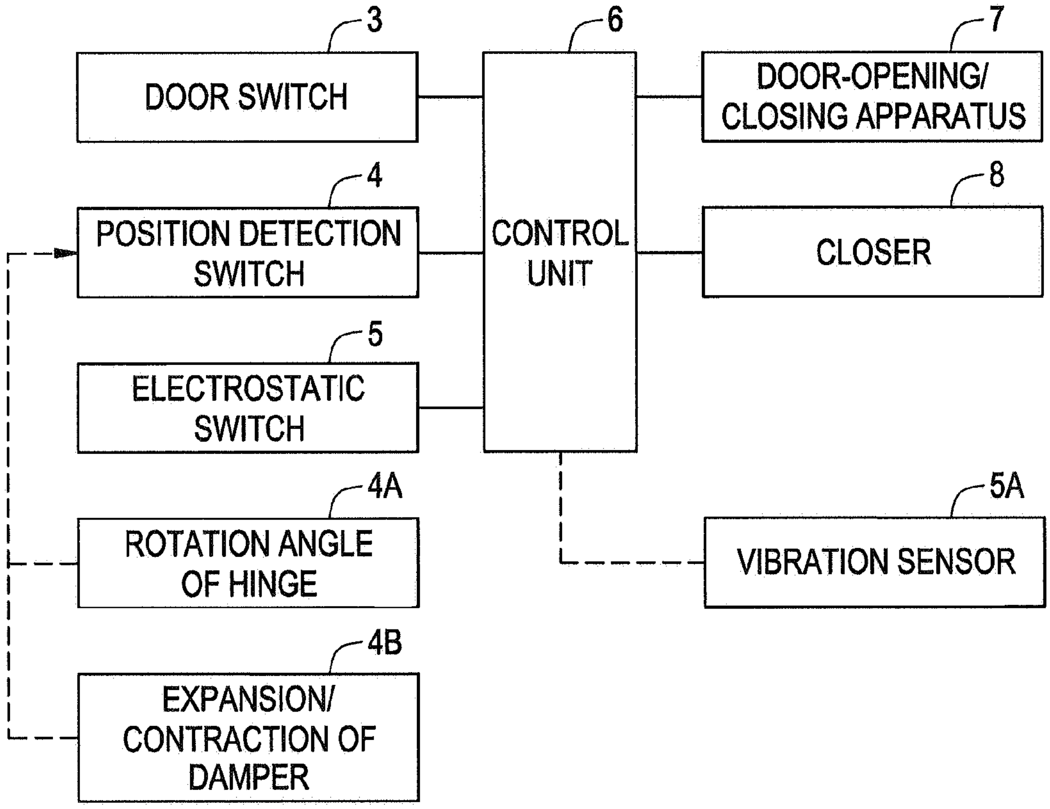
FIG. 6 is a block diagram of the door-opening/closing apparatus.
Figure 7A:
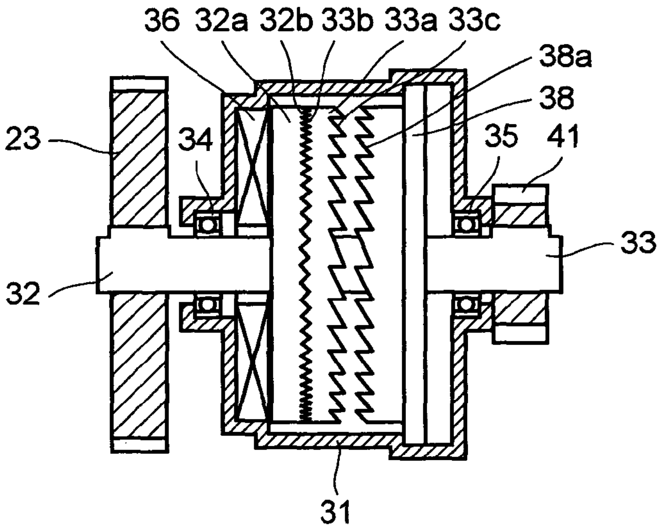
FIG. 7A illustrates an operation of the clutch in a current-on state.
Figure 7B:
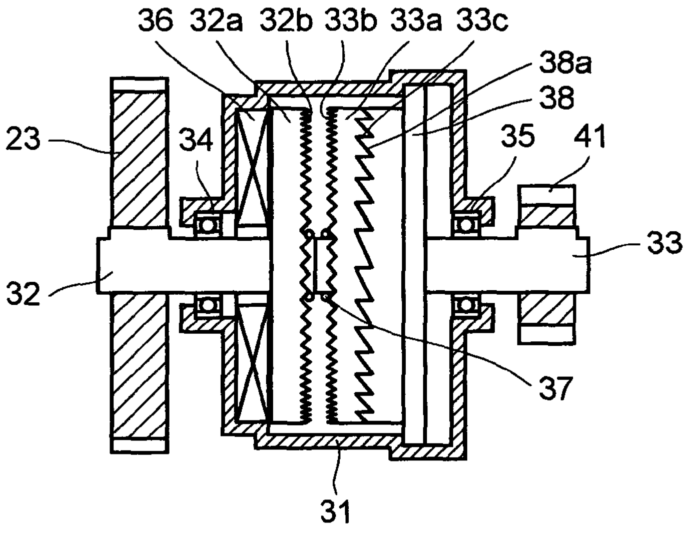
FIG. 7B illustrates the operation of the clutch in a current-off state.
Figure 8:
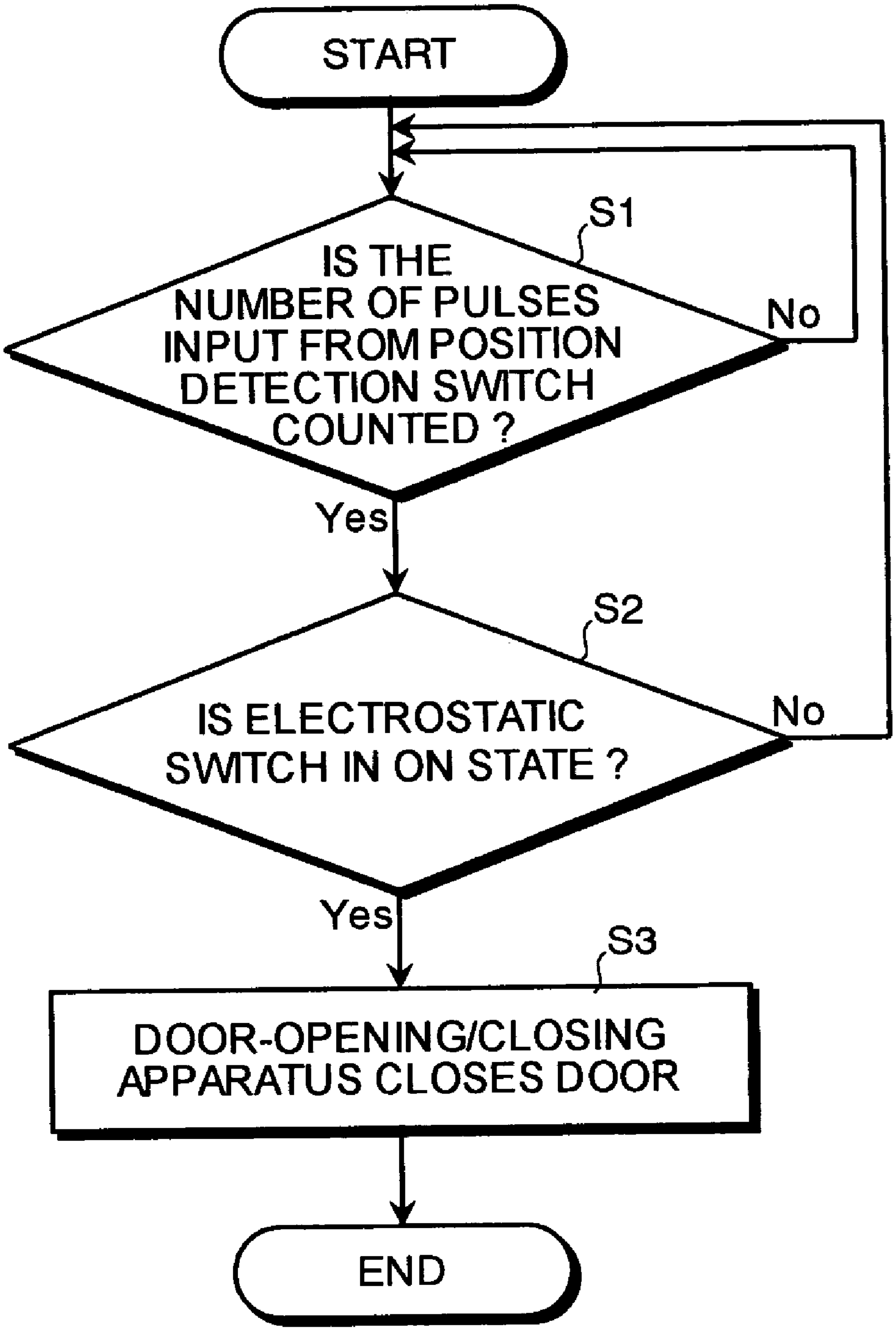
FIG. 8 is a flowchart of the operation of the door-opening/closing apparatus.

Exemplary embodiments of a door-opening/closing apparatus according to the present invention are explained in detail with reference to the accompanying drawings. FIG. 1 is an outline view of a vehicle to which a door-opening/closing apparatus of an embodiment of the present invention is applied. FIG. 2 is a schematic diagram of the door-opening/closing apparatus of the embodiment. FIG. 3 is a front view of the door-opening/closing apparatus. FIG. 4 is a side view of the door-opening/closing apparatus. FIG. 5 is a cross-sectional view of a clutch of the door-opening/closing apparatus. FIG. 6 is a block diagram of the door-opening/closing apparatus. FIG. 7A and FIG. 7B illustrate operations of the clutch. FIG. 8 is a flowchart of the operation of the door-opening/closing apparatus.

The door-opening/closing apparatus 7 is mounted between a body 1 of a vehicle and a door 2 that closes an opening 1*a* formed on the body 1, and the door-opening/closing apparatus 7 opens and closes the door 2. For example, the door-opening/closing apparatus 7 is applied to the door 2 that closes the opening of the vehicle such as a tailgate, side gate and the like. In this specification, the door-opening/closing apparatus applied to a door that closes an opening formed in the tailgate is explained as an example. The door-opening/closing apparatus 7 applied to the tailgate is not used independently, but is used together with a damper (not shown in the figure) mounted between the body 1 and the door 2, and a closer 8 fully closes the door 2. The damper supports a weight of the door 2 in a state of being opened, and lightly opens and closes the door 2. The closer 8 fully closes the door 2 that is closed by the door-opening/closing apparatus 7.

As shown in FIGS. 3 and 4, the door-opening/closing apparatus 7 has a driving unit 20, a door-opening/closing mechanism 40 and a clutch 30 interposed between the driving unit 20 and the door-opening/closing mechanism 40.

The driving unit 20 comprises a motor 21, a worm gear 22 mounted on a shaft 21*a* of the motor 21, and a worm wheel 23 that engages with the worm gear 22. The driving unit 20 transmits a power of the motor 21 to the worm gear 22 and the worm wheel 23 in order.

As shown in FIG. 5, the clutch 30 includes a housing 31, and an input shaft 32 and an output shaft 33 that are rotatably supported by the housing 31. The input shaft 32 and the output shaft 33 are supported by the housing 31 in a coaxial manner.

A bearing 34 that rotatably supports the input shaft 32, a bearing 35 that rotatably supports the output shaft 33, and an electromagnetic coil 36 are mounted on the housing 31.

A worm wheel 23 is mounted on the input shaft 32 outside the housing 31. A driving disk 32*a* is integrally formed on the input shaft 32 inside the housing 31. Angle teeth 32*b* are formed on a surface of the driving disk 32*a* on the side of the output shaft 33.

A follower disk 33*a* opposed to the driving disk 32*a* is integrally formed on the output shaft 33 inside the housing 31. Angle teeth 33*b* that engage with the teeth 32*b* on the driving disk 32*a* are formed on a surface of the follower disk 33*a* opposed to the driving disk 32*a*. Saw teeth 33*c* are formed on a surface of the follower disk 33*a* that is opposite to the surface opposed to the driving disk 32*a*. The saw teeth 33*c* comprise surfaces intersecting with a circumferential direction at right angles, and surfaces having an acute angle with respect to the circumferential direction for connecting the surfaces with each other. A compression spring 37 that biases the follower disk 33*a* away from the driving disk 32*a* is inserted between the driving disk 32*a* and the follower disk 33*a*.

A brake disk 38 that is opposed to the follower disk 33*a* is mounted on the housing 31. Saw teeth 38*a* are formed on a surface of the brake disk 38 that is opposed to the follower disk 33*a*. The saw teeth 38*a* engage with the teeth 33*c* formed on the follower disk 33*a*. Like the teeth 33*c* formed on the follower disk 33*a*, the saw teeth 38*a* comprise surfaces intersecting with a circumferential direction at right angles, and surfaces having an acute angle with respect to the circumferential direction for connecting the surfaces with each other. If the follower disk 33*a* and the brake disk 38 are engaged with each other, rotation of the follower disk 33*a* is prevented in a direction in which the surfaces of the teeth 33*c* of the follower disk 33*a* intersecting with the circumferential direction at right angles, and surfaces of the teeth 38*a* on the brake disk 38 intersecting with the circumferential direction at right angles abut against each other, and rotation of the follower disk 33*a* is permitted in a direction in which the surfaces of the teeth 33*c* of the follower disk 33*a* intersecting with the circumferential direction at right angles, and surfaces of the teeth 38*a* of the brake disk 38 intersecting with the circumferential direction at right angles are separated away from each other.

Therefore, the clutch 30 transmits the power from the driving unit 20 to the door-opening/closing mechanism 40 when current flows, and interrupts the transmission of the power from the driving unit 20 to the door-opening/closing mechanism 40 when no current flows. When no current flows, the clutch 30 brakes the door-opening/closing mechanism 40 in an opening direction of the door 2, and allows the door-opening/closing mechanism 40 to be operate in a closing direction. Therefore, it is possible to stop the door 2 at any position when no current flows, and it is possible to close the door 2 in the closing direction by applying a force to the door 2.

The door-opening/closing mechanism 40 comprises a gear 41 mounted on an output shaft of the clutch 30, a gear train 42 that engages with the gear 41, a rotation arm 45 coaxially mounted on an output shaft of the gear train 42, and a retractable arm 46 connected to the rotation arm 45. The door-opening/closing mechanism 40 can open and close the door 2 by the power transmitted from the driving unit 20 through the clutch 30.

The door-opening/closing apparatus 7 is connected to a control unit 6. The control unit 6 is connected to a door switch 3, a position detection switch 4, an electrostatic switch 5 and the closer 8.

The door switch 3 is, for example, a driver switch disposed in the vicinity of a driver's seat, an open handle switch disposed in the vicinity of an open handle, a keyless switch built in a vehicle key, or a gate switch disposed on an inner side of a tailgate. The door switch 3 switches between a closing command and an opening command depending upon a length of ON time of the switch. For example, when the door switch 3 is pressed once, it is interpreted as being the closing command of the door 2, and when the door switch 3 is pressed for a long time, it is interpreted as being the opening command of the door 2. When the door switch 3 is pressed at the halfway through the opening or closing operation of the door 2, it is interpreted as being an opening-stop command or closing-stop command of the door 2. An input from the open handle switch is interpreted as being the opening command of the door 2 irrespective of length of ON time of the switch. An input from the gate switch is interpreted as being the closing command of the door 2 irrespective of the length of ON time of the switch.

The position detection switch 4 detects a door position, and detects a position of the door 2 in each position between a fully closed position and a fully opened position. For example, a gear having a large diameter is selected from the gear train 42 of the door-opening/closing mechanism 40, and a rotation angle of that gear is monitored, thereby detecting the position of the door. That is, a large number of holes formed in the gear having the large diameter in its circumferential direction are monitored by the position detection switch 4, thereby detecting the position of the door 2. The control unit 6 counts the number of pulses of a signal (pulse signal) that is input from the position detection switch 4, thereby specifying the door position. When the door 2 moves in the closing direction also, the position detection switch 4 inputs the pulse signal to the control unit 6. Therefore, the position detection switch 4 functions as door-movement detection unit, and the control unit 6 can detect the movement of the door 2 in the closing direction.

The electrostatic switch 5 is provided as a sensing unit that detects a fact that a user touches, and the electrostatic switch 5 forms a mold on a lower portion of the door 2. When the position detection switch (door-movement detection unit) 4 detects a movement of the door 2 and the electrostatic switch 5 is turned ON, the control unit 6 judges that the door 2 is attempted to be closed by the user.

The closer 8 is used for further closing the door 2 that was closed by the door-opening/closing apparatus 7, and brings the door 2 into a fully closed state. That is, based on a condition that the position detection switch 4 detects the closed state of the door 2, the door-opening/closing apparatus 7 drives the closer 8 to bring the door 2 into the fully closed state.

Next, the operation of the door-opening/closing apparatus 7 of the present invention is explained. If the door switch 3 inputs the opening command of the door 2, electricity is supplied to the electromagnetic coil 36, and a current-on state is established. In the current-on state, as shown in FIG. 7A, the follower disk 33*a* is engaged with the driving disk 32*a* against a biasing force of the compression spring 37, and the follower disk 33*a* and the brake disk 38 are separated from each other. At that time, the teeth 32*b* of the driving disk 32*a* and the teeth 33*b* of the follower disk 33*a* are engaged with each other. Rotation of the motor 21 is transmitted to the door-opening/closing mechanism 40, and the door 2 is gradually opened. If the door opening-stop command is input during the opening operation of the door 2, the supply of electricity to the motor 21 and the electromagnetic coil 36 is stopped, and the current-off state is established. As a result, the door 2 is stopped at the halfway through the opening process. If an opening-stop signal is not input during the opening process of the door 2, the supply of electricity to the motor 21 and the electromagnetic coil 36 is stopped at the fully opened position of the door 2, and the current-off state is established.

When the door 2 is at the halfway through the opening process or at the fully opened position in the current-off state, as shown in FIG. 7B, the driving disk 32*a* and the follower disk 33*a* are separated from each other by the biasing force of the compression spring 37, and the follower disk 33*a* and the brake disk 38 are coupled to each other. At that time, since the teeth 33*c* of the follower disk 33*a* and the teeth 38*a* of the brake disk 38 mesh with each other, the follower disk 33*a* cannot rotate. Since the teeth 33*b* of the follower disk 33*a* can climb over the teeth 38*a* of the brake disk 38 and rotate, the door opening/closing apparatus 7 allow the follower disk 33*a* to rotate only in one direction (closing direction of the door 2). That is, the door 2 is stopped at any position, but if a force is applied to the door 2, the door 2 can be closed.

If a closing command of the door 2 is input from the above state, electricity is supplied to the electromagnetic coil 36, and the current-on state is established. In the current-on state, as shown in FIG. 7A, the follower disk 33*a* is coupled to the driving disk 32*a* against the biasing force of the compression spring 37, and the follower disk 33*a* and the brake disk 38 are separated from each other. At that time, the teeth 32*b* of the driving disk 32*a* and the teeth 33*b* of the follower disk 33*a* mesh with each other. The rotation of the motor 21 is transmitted to the door-opening/closing mechanism 40 to gradually close the door 2. If the closing-stop command is input during the closing process of the door 2, the electricity supply to the motor 21 and the electromagnetic coil 36 is stopped, and the current-off state is established. As a result, the door 2 is stopped at the halfway through the closing operation. If the closing-stop command of the door 2 is not input at the halfway through the closing operation of the door 2, the electricity supplied to the motor 21 and the electromagnetic coil 36 is stopped, and the current-off state is established.

If the door 2 is at the halfway through the closing operation in the current-off state, as shown in FIG. 7B, the driving disk 32*a* and the follower disk 33*a* are separated from each other by the biasing force of the compression spring 37 like the case in which the door 2 is at the halfway through the opening operation or at the fully opened position, and the follower disk 33*a* and the brake disk 38 are engaged with each other. At that time, since the teeth 33*c* of the follower disk 33*a* and the teeth 38*a* of the brake disk 38 are engaged with each other, the follower disk 33*a* cannot rotate. Since the teeth 33*b* of the follower disk 33*a* can climb over the teeth 38*a* of the brake disk 38 and rotate, the follower disk 33*a* is allowed to rotate only in one direction (closing direction of the door 2). That is, in this case, although the door 2 stops at any position, if a force is applied to the door 2, the door 2 can be closed.

When the door 2 is opened, i.e., when the door 2 is at the halfway through the opening operation, or when the door 2 is at the halfway through the closing operation or when the door 2 is in the fully opened position, if a portion of the door 2 on which the electrostatic switch 5 is mounted is pushed, the door 2 moves in the closing direction as shown in FIG. 8. If the door 2 moves in the closing position, the control unit 6 starts counting the number of pulses input from the position detection switch 4. If a predetermined number of pulses is input to the control unit 6 (YES in step S1), the control unit 6 checks whether the electrostatic switch 5 is in ON state (step S2). Since the portion of the door 2 on which the electrostatic switch 5 is mounted is pushed, the electrostatic switch 5 is in the ON state (YES in step S2), the control unit 6 judges that the door 2 is attempted to be closed the user. Then, the door-opening/closing apparatus 7 closes the door 2 (step S3).

Even if the door 2 moves in the closing direction by some reason during the opening operation of the door 2, the door 2 does not close by itself unless a user touches the electrostatic switch 5. For example, even if a child jumps in the vehicle and the door 2 moves in the closing direction (YES in step S1), since the electrostatic switch 5 is in OFF state (NO in step S2), the control unit 6 judges that the door 2 is not attempted to be closed by the user. Therefore, the door-opening/closing apparatus 7 does not close the door 2 by itself.

The door-opening/closing apparatus 7 according to the embodiment of the present invention can be applied not only to the door 2 that closes the tailgate, but also to a slide door that closes a side gate.

Although the position detection switch 4 specifies the door position by detecting the rotation angle of the large-diameter gear of the gear train in the door-opening/closing mechanism 40 in the embodiment, the position detection switch 4 may specify the door position by detecting a rotation angle of a hinge that supports the door 2, as indicated at 4A in FIG. 6, or by detecting expansion and contraction of the damper as indicated at 4B in FIG. 6.

Although the door-opening/closing apparatus 7 judges whether the door 2 is attempted to be closed by the user based on an input of the electrostatic switch 5, a temperature sensor switch may be mounted instead of the electrostatic switch 5, and the door-opening/closing apparatus 7 may judge whether the door 2 is attempted to be closed by the user based on an input of the temperature sensor switch.

A vibration sensor (shown as 5A in the figure) may be mounted on the body 1 instead of the electrostatic switch 5, and the door-opening/closing apparatus 7 may judge whether the door 2 is moved artificially based on presence or absence of input of the vibration sensor. In this case, the control unit 6 judges that the door 2 is attempted to be closed by the user, if there is no input from the vibration sensor.

As explained above, according to the door-opening/closing apparatus 7 of the embodiment of the present invention, it is judged whether the door 2 is attempted to be closed by the user based on the presence or absence of input of the electrostatic switch 5 or input from the vibration sensor. Therefore, the door 2 is not closed arbitrarily or accidentally against the user's will.

As explained above, the door-opening/closing apparatus according to first to fourth aspect of the present invention comprises a door movement detection unit that detects a movement of a door, and a judgment unit that judges whether the door is attempted to be closed, the door movement detection unit detects the movement of the door, and when the judgment unit judges that the door is attempted to be closed, the apparatus closes the door. Therefore, the door is not triggered to be closed by vibrations of a vehicle body.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A door-opening/closing apparatus for a vehicle comprising:

a body having an opening;

a door for closing the opening of the body;

a driving unit that drives the door to close the door;

a first sensor and a second sensor different from said first sensor;

a door movement detection unit responsive to a condition of said first sensor that detects a closing movement of the door and generates a movement detection output;

a judgment unit responsive to a condition of said second sensor that judges whether the door is attempted to be closed and generates a closing attempt output; and a motor control unit that, in response to the movement detection output generated when the door movement detection unit detects a closing movement of the door, and the closing attempt output generated when the judgment unit judges that the door is attempted to be closed, controls the driving unit to automatically close the door.

2. The door-opening/closing apparatus according to claim 1, wherein the first sensor comprises a sensor of an operation of the driving unit, and said door movement detection unit detects the closing movement of the door by monitoring said first sensor.

3. The door-opening/closing apparatus according to claim 1, wherein the first sensor comprises a sensor of a hinge rotation angle of a hinge that supports the door, and said door movement detection unit detects the closing movement of the door by detecting a condition of said first sensor.

4. The door-opening/closing apparatus according to claim 1, wherein the first sensor comprises a sensor of an expansion and contraction of a damper mounted between the body and the door, and said door movement detection unit detects the closing movement of the door by detecting a condition of said first sensor.

5. A door-opening/closing apparatus for a vehicle comprising:

a body having an opening;

a door for closing the opening of the body;

a driving unit that drives the door to close the door;

a first sensor and a second sensor different from said first sensor;

a door movement detection unit responsive to a condition of said first sensor that detects a closing movement of the door and generates a movement detection output;

a judgment unit responsive to a condition of said second sensor that judges whether the door is attempted to be closed and generates a closing attempt output; and a motor control unit that, in response to the movement detection output generated when the door movement detection unit detects a closing movement of the door, and the closing attempt output generated when the judgment unit judges that the door is attempted to be closed, controls the driving unit to automatically close the door, wherein the door includes a sensing unit as said second sensor that senses a human's touching the door, and wherein when the sensing unit senses the human's touching the door, the judgment unit judges that the door is attempted to be closed.

6. The door-opening/closing apparatus according to claim 5, wherein the sensing unit is an electrostatic switch.

7. The door-opening/closing apparatus according to claim 5, wherein the sensing unit is a temperature sensor switch.

8. The door-opening/closing apparatus according to claim 1, wherein the body includes a vibration sensor as said second sensor that senses a vibration of the body, and wherein when the door movement detection unit detects the closing movement of the door, and when the vibration sensor senses no vibration of the body, the judgment unit judges that the door is attempted to be closed.

9. The door-opening/closing apparatus according to claim 1, wherein the door is a back door that closes a tailgate formed on a rear portion of the body.

10. The door-opening/closing apparatus according to claim 1, wherein the door is a side door that closes a side gate formed on a side portion of the body.

11. The door-opening/closing apparatus according to claim 1, further comprising:

a door switch for switching between a closing command and an opening command depending upon a length of ON time of the switch to close or open the door.

* * * * *